No. 807,744. PATENTED DEC. 19, 1905.
C. A. IMMLER.
VEHICLE TIRE.
APPLICATION FILED JAN. 26, 1905.

Witnesses
Chas H Stahl
J. R. Huffman

Inventor
Charles A Immler
per T. W. Kimber
Attorney

UNITED STATES PATENT OFFICE.

CHARLES A. IMMLER, OF AKRON, OHIO.

VEHICLE-TIRE.

No. 807,744.     Specification of Letters Patent.     Patented Dec. 19, 1905.

Application filed January 26, 1905. Serial No. 242,790.

*To all whom it may concern:*

Be it known that I, CHARLES A. IMMLER, a citizen of the United States, residing at Akron, in the county of Summit and State of Ohio, have invented certain new and useful Improvements in Vehicle-Tires; and I do declare that the following is a full, clear, and exact description of the invention, which will be easily applied to any clencher-rim of any size that is in general use, and especially to such wheels known as "automobile-wheels."

My invention relates to improvements on solid-rubber tires to be used on clencher-rims. The construction of the rubber tire and its fastening in the base of the tire, which holds the tire rigidly in the channel on the wheel, is particularly pointed out in the claims.

One of the objects of my invention is to manufacture a tire which can be easily applied by any one to an automobile-wheel.

Figure 1:
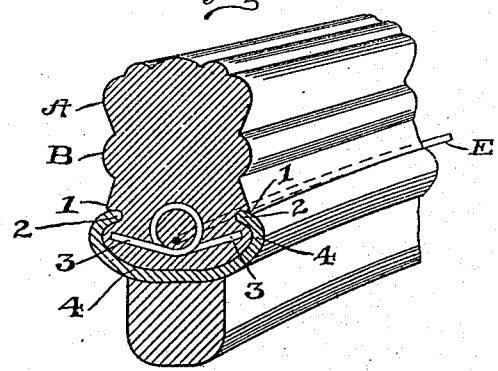
Figure 2:
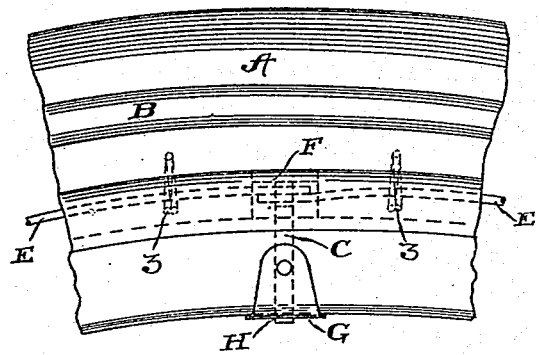
Figure 3:
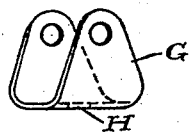
Figure 4:
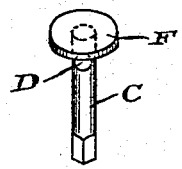
Figure 5:
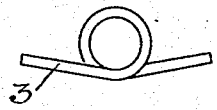

In reference to the drawings, Figure 1 is a cross-section and perspective view of the tire and rim to which the tire is attached. Fig. 2 is a side view of a segment of the tire and rim of a wheel, showing the terminal or ends of wire used for fastening the tire and holding the tire rigidly in the channel. Fig. 3 is felly-plate with a square hole in center of plate, with a round hole at each end of plate for putting screws through into the felly or wooden rim of wheel. Fig. 4 is a key with a hole in to pass the ends of the wire that encircles the tire through and twisting around with a wrench, thus tightening the wire when the tire is on the channel. Fig. 5 is a wire spring made with a loop in center and extending from one side of the base of the tire to the opposite side, thus stiffening the tire and holding the same in the clench on the rim or steel channel.

In reference to Fig. 1, tire A is made up of solid rubber of such resiliency and yield as is usually made for such tires now in general use. The tread is generally beaded, but can be made smooth, if desired, with concave sides with oval bead in center on each side of rubber tire and extending the full length of tire, as shown by letter B in Fig. 1, and can be made large or small as the resiliency of the tire demands, thus preventing the lopping over or skidding when turning corners. 1 is a round bead to protect dirt from working under channel. 2 is a groove for the clench or channel to fit in. 3 is wire spring placed in tire at intervals of three-fourths (¾) of an inch or more apart the entire circumference of the tire, is used for stiffening the base of the tire, and yet has spring enough to be easily pressed together and be forced into the channel, then springing under the clench of the channel. E is the wire which encircles the rubber tire passing through the hole in the loop of the spring 3. This wire is used for holding the spring 3 securely to the channel 4, thus fastening it solidly in the clench of the channel, and serves to give the tire strength at the point where the outward pull and strain upon the tire is greatest.

In reference to Fig. 2, this figure shows plainly a segment of tire. A is the tire proper. B is the oval bead that stiffens or softens the center of tire, as desired. 3 is the loop-spring with one or more loops at its center set in the base of the tire at intervals of three-fourths (¾) of an inch or more apart the entire circumference of the tire. E E represent the wire that circles the wheel, with the loose ends lapping each other and passing in the hole in the key C. This is done expressly to allow the wire to expand and shrink back to place again when the tire is stretched over the channel or rim. Then the key C is turned around, thus tightening the end of wire E to hold spring 3 firmly to channel 4. Then felly-plate G is placed over end of key C, that protrudes through the wood felly on wheel, thus holding the key C firmly, so that it cannot turn either way. Then screws are set in each end of felly-plate to hold the felly-plate in position. Felly-plate G with square hole H in center and round holes at each end for screws in Fig. 3 is placed in position, as shown by H and G in Fig. 2. Key C with square end, with washer at the other end, with hole D through key C, is used to pass the wire E in Fig. 2 through the same, thus making a fastening for wire E and placed in position in Fig. 2, as shown by letters C and F. The wire with loop in the center can be made of spring-wire and set in rubber tire, as shown in Fig. 1, which extends from one side of the tire to the other and at such distance apart as will be required to make a solid base for securing the tire in clencher-channel firmly.

The object of my invention is to construct a tire that will fit any clencher-channel of any size in general use and one that can be fastened solidly in the channel and pr— any slipping, stripping, or removi— use.

What I claim, and desire to secure by Letters Patent, is—

1. The combination with a clencher-rim having inturned flanges forming channels, of a solid-rubber tire to fit said channel, having a longitudinal convex or oval bead at the center of the side of said tire Fig. 2, having at intervals loop-springs containing one or more convolutions at their center Fig. 5, and embedded transversely across said tire and near the base of said tire with their ends extending outward and slightly upward to the outer edge of the said tire and contained within the inturned flanges of the clencher-rim, with key C Fig. 4, made with a washer at end to be inserted in the base of said tire, said key to have a hole or opening through its end near the washer for the purpose of permitting the ends of the longitudinal wire to pass through, said key to have a square end to pass through an opening in the clencher-rim and felly and to be held in place by the felly plate G Fig. 3, which has a square opening in its center and which plate is made to fit over the felly all as substantially shown and described.

2. The combination with a clencher-channel of a solid-rubber tire with oval longitudinal stiffening-beads at the center of the sides of the said tire, wires with one or more convolutions at their center embedded in said tire, a longitudinal wire passing through said wire loops embedded near the base of the said tire having its ends lapping each other for a short indefinite length, a key and felly-plate to tighten and to hold the said tire firmly in the said clencher-rim, thus securing a direct and straight pull on said longitudinal wire and a binding effect both at the center and the ends of the said transverse wires substantially as shown and described.

In testimony whereof I have signed my name to this specification in the presence of two subscribing witnesses.

CHARLES A. IMMLER.

Witnesses:
 CHAS. H. STAHL,
 H. V. EGBERT.